(12) United States Patent
Vanouche et al.

(10) Patent No.: US 7,810,617 B2
(45) Date of Patent: Oct. 12, 2010

(54) FRICTION ELEMENT AND DISC BRAKE

(75) Inventors: Norbert Vanouche, Trelaze (FR); Pascal Mary Dit Cordier, Bagnères de Bigorre (FR); Andre Gaye, Maisons Alfort (FR); Daniel Menguy, Laval (FR); Christophe Houdebine, Juigne sur Loire (FR)

(73) Assignee: Robert Bosch GmbH, Stuttgart (DE)

( * ) Notice: Subject to any disclaimer, the term of this patent is extended or adjusted under 35 U.S.C. 154(b) by 549 days.

(21) Appl. No.: 11/576,835

(22) PCT Filed: Sep. 23, 2005

(86) PCT No.: PCT/FR2005/002374

§ 371 (c)(1),
(2), (4) Date: Oct. 24, 2007

(87) PCT Pub. No.: WO2006/040428

PCT Pub. Date: Apr. 20, 2006

(65) Prior Publication Data

US 2008/0087506 A1 Apr. 17, 2008

(30) Foreign Application Priority Data

Oct. 8, 2004 (FR) .................................. 04 10665

(51) Int. Cl.
*F16D 65/40* (2006.01)

(52) U.S. Cl. ................................. 188/73.38; 188/73.35

(58) Field of Classification Search .... 188/73.35–73.38
See application file for complete search history.

(56) References Cited

U.S. PATENT DOCUMENTS

| 4,056,174 | A | * | 11/1977 | Wienand et al. | ......... 188/73.36 |
|---|---|---|---|---|---|
| 4,289,217 | A | | 9/1981 | Heibel et al. | |
| 4,527,669 | A | * | 7/1985 | Meyer et al. | ............. 188/73.38 |
| 5,111,914 | A | * | 5/1992 | Thiel et al. | ............... 188/73.34 |
| 6,182,801 | B1 | * | 2/2001 | Yoshida et al. | ........... 188/73.45 |

FOREIGN PATENT DOCUMENTS

| DE | 3641921 | 8/1987 |
|---|---|---|
| EP | 0475335 | 3/1992 |

OTHER PUBLICATIONS

International Search Report from the European Patent Office.

* cited by examiner

*Primary Examiner*—Melanie Torres Williams
(74) *Attorney, Agent, or Firm*—Michael Best & Friedrich LLP

(57) ABSTRACT

A friction element for a disk brake that includes a support plate (2) on which is fixed a friction material designed to come into contact with a first face of a brake disk. The friction element also includes an elastic element for returning the friction element to its rest position, said elastic element including a wound section of turns from which extend a first and second arm (30, 32) of different lengths designed to bear elastically against an arch of a caliper of the disk brake. The wound section of turns is fitted into an orifice made in a radial projection of the support plate.

16 Claims, 4 Drawing Sheets

FRICTION ELEMENT AND DISC BRAKE

BACKGROUND OF THE INVENTION

The present invention relates to a friction element, in particular of the pad type, and to a disk brake that includes such an element.

Document EP 0 475 335 A1, in particular, discloses a friction element that includes a spring designed to reduce the vibrations of brake pads in a disk brake. The spring, made from steel wire, includes a wound section in its central part and a first and a second arm of different lengths extending in two opposite directions, substantially tangential to the central, wound section. The spring is fixed to an upper part of a brake pad lining support, by means of a rivet mounted in the wound section, and the respective ends of the arms are designed to come to bear against the inside surface of an arch of a caliper of the disk brake. This spring is mounted on the inside and outside pads, i.e. on either side of a brake disk.

SUMMARY OF THE INVENTION

Disk brakes are essential components in the safe performance of a motor vehicle and it is therefore necessary for mountings to be extremely reliable. In the case of disk brakes provided with such brake pads it is thus necessary carefully to check the mounting of the rivet, which, in the event of defective fastening, may not hold the spring throughout the brake's service life, which means that the spring then risks being placed between the disk and the inside pad, unacceptably reducing the anticipated braking level of the brake.

Furthermore, a persistent problem with disk brakes is insufficient recoil of the brake pads, in particular of the inside brake pad, which gives rise to residual friction between the disk and the pad and consequently generates premature wear of the friction linings. Currently, the inside pad recoils naturally when the pressure in the brake is relaxed, owing to a slight run-out of the brake disk. Furthermore, the hydraulic piston that causes the displacement of the inside pad is returned to position via a square seal, which also guarantees the leaktight nature of the sliding of the piston. Disk brakes of this design function satisfactorily, but it would be preferable to enhance the way in which they function.

Moreover, it is increasingly desired for devices provided on motor vehicles to function extremely quietly. This is therefore also the case of the braking circuit, in particular for disk brakes provided on motor vehicles. A noise that frequently arises when the disk brake functions is termed "squeal" in English. This noise arises when the disk brake is functioning at low pressure. It is therefore necessary to reduce and, if possible, to eliminate this noise while firmly holding the disk pad or pads relative to the carrier and/or the caliper.

Moreover, it is also necessary to obtain low cost prices for the disk brake in order that products should remain competitive. To that end, it is desirable to have a disk brake of simple, rapid construction that requires a minimum of parts.

It is therefore an object of the present invention to offer a friction means that provided improved functioning of the disk brake.

It is also an object of the present invention to offer a disk brake of low cost price.

It is also an object of the present invention to offer a simple, rapid method for manufacturing a brake.

It is therefore an object of the present invention to offer a disk brake that offers not only a very low residual torque and thus silent, efficient return of the brake pads, but also a high level of reliability in terms of manufacture and a low cost price.

These objects are achieved by a brake pad provided with a support plate in which an orifice pierced in which a wound section of a wire spring is mounted, the spring including a first and second arm designed to react against an arch of a disk brake, the arms being of different lengths so as to exert an asymmetric force on the pad toward the carrier, significantly reducing squeal, the arms being elastically deform able in the axial direction of displacement of the pad and exerting a force that returns the pad to its rest position.

In other words, the wound section of substantially cylindrical shape is inserted in an orifice of corresponding diameter, one arm extending on either side of the support plate. The present invention thus provides a highly reliable fastening since, as no additional part is added, the risk of defective mounting is thus reduced. Furthermore, owing to the fact that the arms bear against the arch, the turns of the wound section are permanently deformed radially outward, improving the mounting of the spring in the orifice of the support plate.

Lastly, in an extreme case of the wound section actually being freed from the orifice, the fact that there is an arm arranged on either side of the support plate means that the spring would remain connected to the brake pad and would not become inserted between the disk and the brake pad.

The principal subject of the present invention is therefore a friction element for a disk brake that includes a support plate and a friction material fixed on one of the faces of said support plate, said support plate being substantially in the form of an arc of a circle, and that also includes a projection extending radially toward the outside of the arc of the circle, a spring element being fixed to said radial projection, said spring element being produced from wire wound as turns and provided with a first and with a second arm that extend in two opposite directions substantially tangentially to said turns, characterized in that said support plate includes an orifice for the fitting of the spring element, in which the wound section is mounted, the first and second arms extending on either side of the support plate, and in that the first and second arms are of different lengths so as to exert a force oriented toward the front or toward the rear of the friction element.

A further subject of the present invention is a friction element for a disk brake that is characterized in that the second arm is oriented forward of the first arm in the direction of rotation of the brake disk. This particular arrangement guarantees that the friction element is extremely stable at low braking pressure because of the increased bearing of the friction element against the carrier of the disk brake in the direction of rotation of the brake disk.

A further subject of the present invention is a friction element for a disk brake that is characterized in that the respective ends of the first and second arms are curved substantially toward an axis of the turns.

A further subject of the present invention is a friction element that is characterized in that it includes, respectively at a first and a second end of the arc of the circle, a first and a second finger capable of interacting, respectively, with a first and a second slideway made in a carrier of the disk brake.

A further subject of the present invention is a friction element that is characterized in that it forms the inside friction element of the disk brake.

A further subject of the present invention is a disk brake that includes a caliper, an inside friction element and an outside friction element, at least one piston capable of applying the inside friction element against a first face of a disk brake, characterized in that it includes at least one friction element according to the present invention, the arms of said spring being mounted so as to bear under mechanical stress against an inside face of an arch of the caliper.

A further subject of the present invention is a disk brake that is characterized in that it includes a carrier designed to be secured to a stub axle of a motor vehicle, in that the caliper is mounted so as to slide relative to the carrier, in that the caliper includes a nose capable of applying the outside pad against a second face of the brake disk, in that it includes first and second slides of a shape that complements the first and second fingers of the inside pad, the first finger being mounted with clearance in the first slide in the direction of rotation of the brake disk such that the inside pad/carrier assembly forms a rigid framework when the friction material of the inside pad comes into contact with the brake disk.

A further subject of the present invention is a disk brake that is characterized in that the outside pad is integral with the caliper nose.

A further subject of the present invention is a disk brake that is characterized in that the outside pad is held transversely relative to the caliper by interaction of pegs and of cavities for receiving said pegs carried by the friction element and the caliper nose.

A further subject of the present invention is a disk brake that is characterized in that the carrier includes a first and a second pin that extend parallel to the axis of the brake disk and are designed to slide, respectively, in first and second bores made in the caliper.

A further subject of the present invention is a method for manufacturing a friction element that includes, inter alia, the steps of inserting a first arm of a spring element into the orifice of the support plate; bringing the first and the second arms closer together so as to reduce the diameter of the wound section; inserting the wound section into the orifice; relaxing the arms of the return spring, the wound section then being held firmly in the orifice of the support plate.

The present invention has the advantage that it is very simple to produce.

At the end of the braking phase, the friction element according to the present invention is returned to its rest position on account of the elasticity of the arms, holds the inside pad and thus reduces the vibrations responsible for the noise both when there is no braking and when there is braking with a low actuation pressure.

BRIEF DESCRIPTION OF THE DRAWINGS

The present invention will be better understood with the aid of the following description and of the appended drawings in which "front" and "rear" are defined relative to the direction of rotation of the brake disk and correspond, respectively, to the right and left of the drawings, "top" and "bottom" corresponding to the upper and lower parts of the drawings, in which.

DETAILED DESCRIPTION

Figure 1:
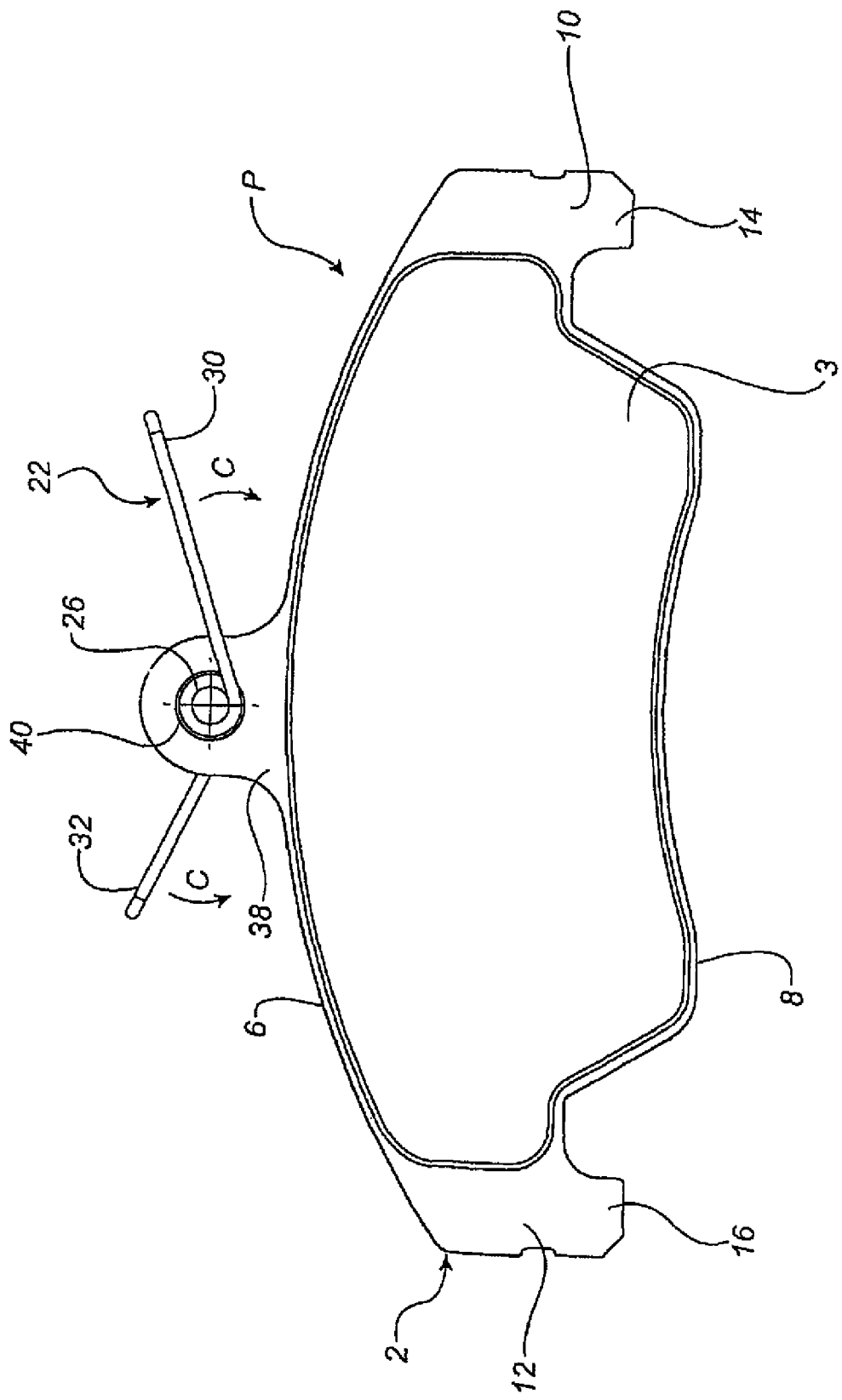
FIG. 1 is a front view of a friction element according to the present invention.

FIG. 1 shows a friction element or brake pad P according to the present invention, which includes a support plate 2 and friction material 3 fixed to a face of the support plate. The friction element is curved so as to follow the outer shape of a brake disk. The friction element includes an upper end 6 delimited by a first arc of a circle and a lower end 8 delimited by a second arc of a circle with a diameter substantially equal to that of the first arc of a circle.

The friction element includes a first 10 and a second 12 lateral end, and a first 14 and a second 16 finger capable of interacting, respectively, with a first 18 and a second 20 slide carried by a carrier and providing axial guiding of the friction element.

The brake pad also includes an elastic element 22 for returning the brake pad to its rest position at the end of the braking phase. The return element 22 is produced, in the example shown, in the form of a wire, advantageously sprung wire, wound in the form of turns so as to form a substantially regular cylinder 26, and each end of the wire 28 forms a first 30 and a second 32 arm capable of interacting with an arch of a caliper.

The return spring 22 is firmly fixed to the support plate 2 via a lug 38 projecting radially toward the outside of the first arc of a circle. The lug 38 is substantially centered on the support plate so as to be substantially in a plane of symmetry of the disk brake.

The lug 38 includes an orifice 40 for receiving the cylinder 26 of turns 24, said orifice 40 having a diameter substantially equal to the diameter of the wound section 26 so as to enable simple insertion of the latter in the orifice 40. When the spring is mounted in the disk brake, the first and second arms 30, 32 tend to move apart in the direction of the arrows C, opening out the wound section and increasing its diameter. In this way, fixing of the spring to the support plate is confirmed at the time of mounting.

Figure 2:
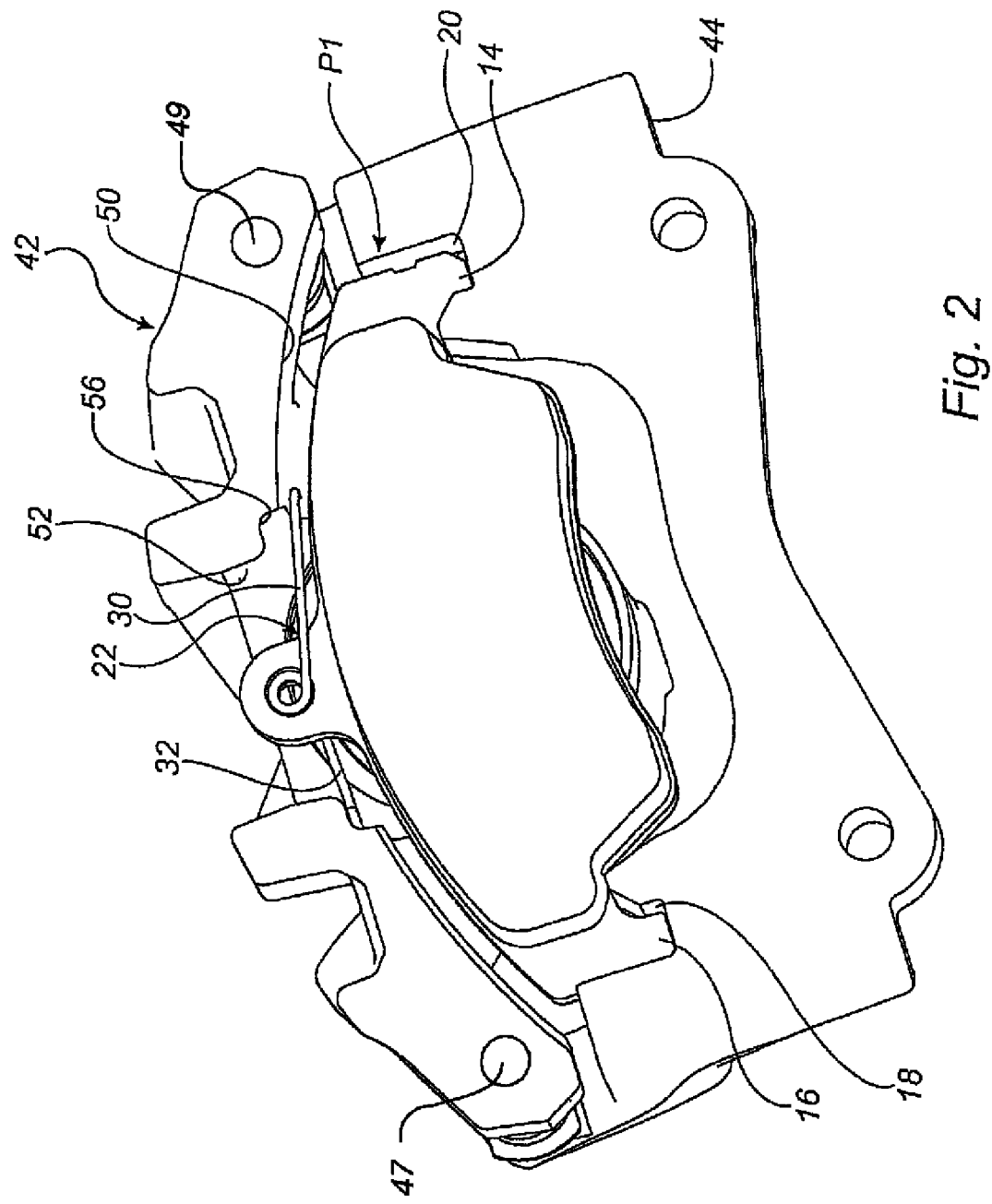
FIG. 2 is a partial perspective view of a disk brake according to the present invention.

In FIGS. 1 and 2, the first 30 arm of the spring 22 arranged in front in the direction of rotation of the brake disk indicated by the arrow F is longer than that of the second 32 arm arranged to the rear in the direction of rotation of the brake disk, the direction of rotation being indicated by the arrow F. A spring of this type applies to the brake pad a force that is greater on the rear part of the brake pad than on the front part, ensuring ongoing bearing of the support plate on the carrier, in particular of the finger 16 in the slide 18. This particular configuration of the spring reduces the noise generated by the brake when braking pressure is low (noise termed "squeal" in English).

Figure 3:
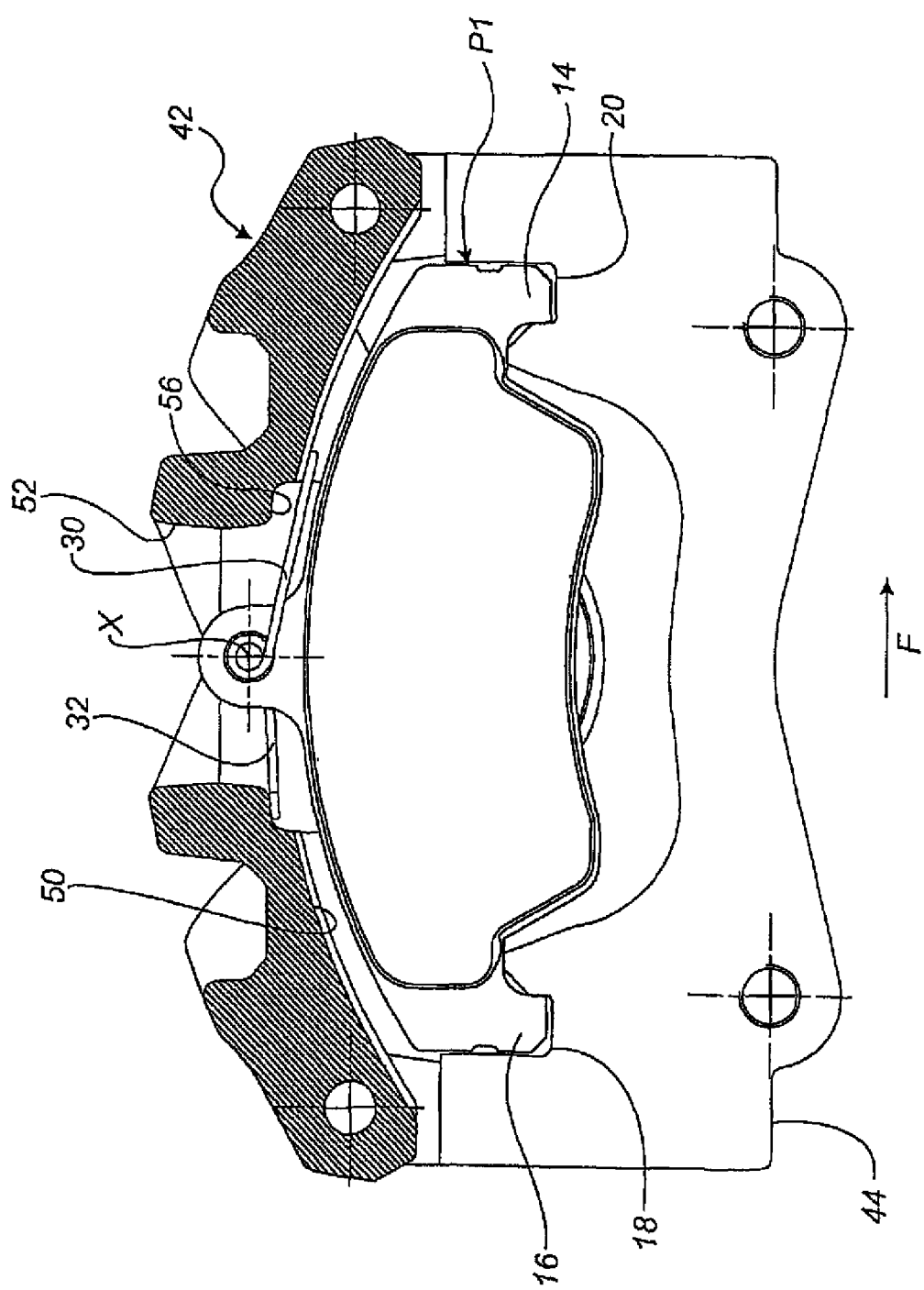
FIG. 3 is a transverse-section view of the disk brake of FIG. 2 that includes a pad according to FIG. 1.

FIGS. 2 and 3 show the brake pad according to the present invention mounted in a disk brake according to the present invention. The disk brake includes a caliper 42 mounted slideably along an axis X orthogonal to the plane of the drawing relative to a carrier 44 fixed to a stub axle, an inside pad P 1 and an outside pad (not shown) being placed opposite one another and designed to be applied, respectively, against a first and a second face of a brake disk (not shown).

The inside brake pad is a pad according to the present invention, mounted between the carrier 44 and the caliper 42 and displaced during a braking phase by a hydraulic piston mounted slideably in a hydraulic cylinder 54. The outside pad bears against a nose of a caliper connected to the hydraulic cylinder by an arch 50. The outside pad is applied against the second face of the brake disk by means of the sliding of the caliper in reaction to the bearing of the first pad P1 against the first face of the brake disk. Sliding between the caliper and the carrier is guaranteed by means of pins (such as first and second pins 47, 49 illustrated in FIG. 2) mounted slideably in bores made in the caliper on either side of the hydraulic cylinder. It will be easily understood that the pins may be carried by the caliper and the bores may be made in the carrier.

The carrier 44 is arranged on just one side of the brake disk.

The carrier 44 includes first 18 and second 20 slides for receiving fingers 14, 16 for guiding the pad P1 as it slides. The first and second arms 30, 32 are mounted so as to bear against the arch 50 such that an ongoing force is applied to the inside pad toward the bottom by the return spring.

The outside pad (not shown) is fixed to the caliper nose, for example by means of screwing. A fixing method will be described with reference to FIG. 4.

In the example shown, the disk brake is of the "push-pull" type, as it is termed in English, i.e. the forces applied to the brake pad when it comes into contact with a face of the brake disk serve to stiffen the disk brake.

When the inside pad comes into contact with a face of the brake disk, it is entrained in the direction of rotation of the brake disk owing to the finger 16, the force that entrains the pad is transmitted to the carrier by means of the slide 18, the pad being "pulled" onto the carrier, and the latter deforms and the finger 14, mounted with clearance in the slide 20, abuts against the carrier and pushes on the carrier, thereby stiffening the disk brake.

The slides have a shape that complements that of the fingers such that the carrier and the support plate form a substantially rigid framework when the inside pad is in contact with the brake disk.

In the example shown, the arch 50 includes an axial aperture 52 that receives the lug and is of sufficient axial size to enable the lug to slide toward the brake disk. The aperture 52 also allows enhanced dissipation of the heat generated during a braking action. Advantageously, the free ends of the arms 30, 32 are curved so as to provide good anchoring of the spring in the arch and also to allow sliding beyond a specific displacement of the inside pad toward the brake disk.

We will now explain the method of functioning of the brake according to the present invention.

During a braking action, the hydraulic pressure increases in the braking circuit, generating a displacement of the piston, which pushes the inside pad P toward the first face of the reaction disk. The ends of the arms 30, 32 become anchored in the arch, but the wound section follows the pad PI and consequently the arms 30, 32 are deformed elastically in order to enable the pad P to come into contact with the brake disk. By reaction, the caliper slides relative to the carrier and applies the outside pad against the brake disk by means of the caliper nose.

When braking ceases, pressure in the braking circuit is reduced and the hydraulic piston withdraws through the effect of a square seal providing leaktight sliding of the hydraulic piston. Owing to the elastic deformation of the arms 30, 32 of the spring 22, the latter exerts an axial elastic return force and the pad P1 is thus reliably returned to the rest position.

At the time of each braking action, the pad lining wears, but the disk brake includes a wear-compensation device that shifts the rest position of the hydraulic piston so that the travel required for the pads to be applied against the disk is not lengthened. In order that the return spring does not impede the actuation of the wear-compensation device, the arms 30, 32 of the spring 22 are dimensioned such that beyond a certain force applied to them the ends of the arms slide on the arch as far as a more advanced position on the arch.

Furthermore, the use of a pad according to the present invention makes it possible, also, to reduce the noise that is termed "rattle" in English, which may arise when there is no breaking owing to floating of the brake pad on account of its being held securely in place when there is no braking.

Figure 4:
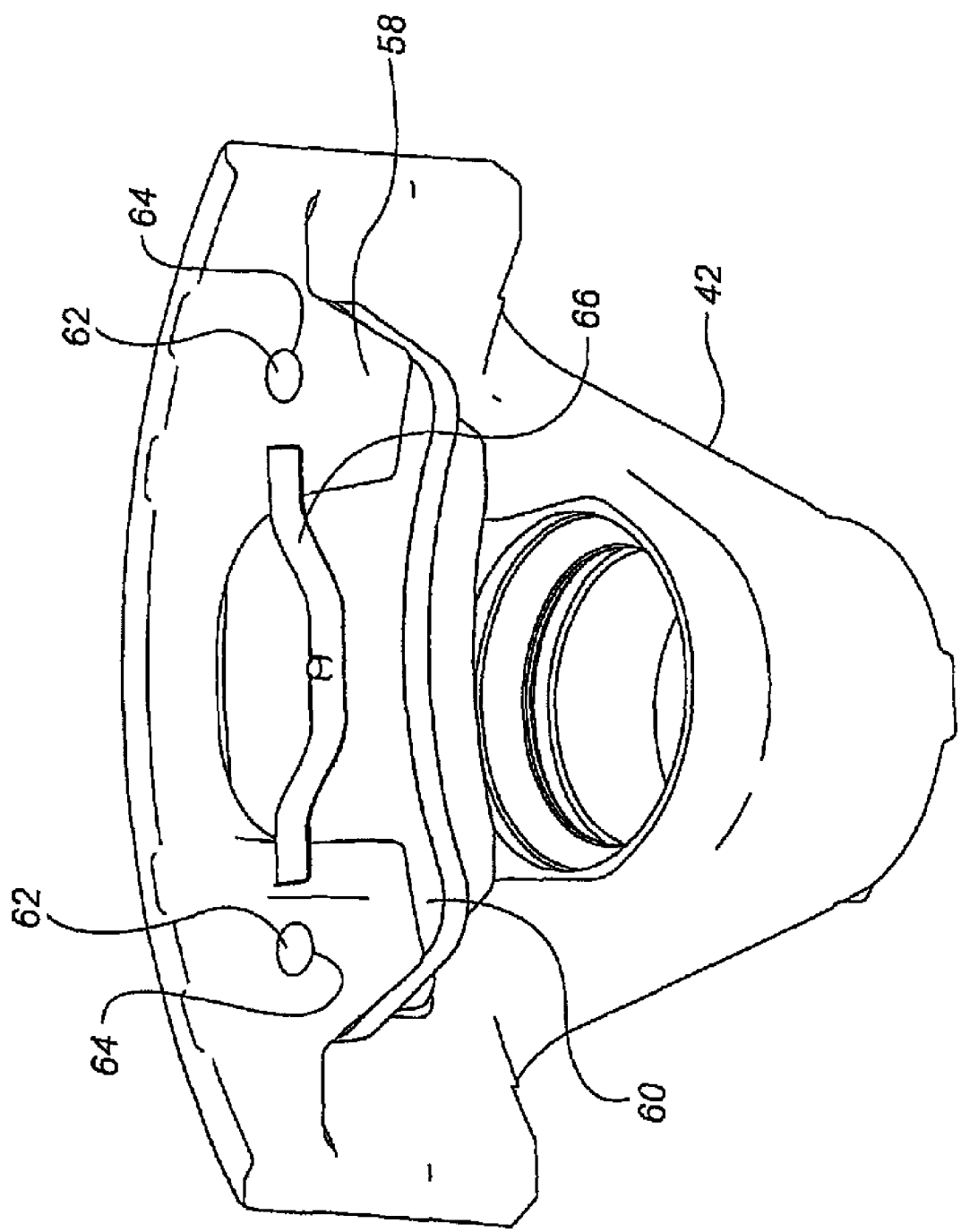
FIG. 4 is a partial perspective view of a second, illustrative embodiment of a disk brake according to the present invention.

FIG. 4 shows a second example of a brake according to the present invention in which the outside pad P2 is fixed on the caliper nose 58 that holds it in terms of rotation. In the example shown, a rear face 60 of the support plate 61, opposite that which includes the brake lining, includes projecting studs 62 that interact with openings 64 made in the caliper nose. The openings and the studs are sized such that fixing of the pad on the caliper nose involves no clearance. Advantageously, a leaf spring 66 is fixed, at its center, on the rear face of the support plate and includes ends that interact with the caliper noses by means of elastic deformation of the leaf spring. Thus, the leaf exerts an ongoing force that brings the support plate and the caliper nose closer together, in order axially to immobilize the outside pad.

The above description deals with a brake with a sliding disk, the pad according to the present invention forming the inside pad, but it will be easily understood that in the case of a brake with a "stationary" disk, including at least two pistons arranged, respectively, on either side of the brake disk, each brake pad is a pad according to the present invention.

It will be easily understood that the present invention also applies to a brake with a disk of conventional type, in which the pins are carried by the caliper and slide in the carrier, the carrier extending on either side of the brake disk and holding not only the inside brake pad but also the outside brake pad stationary in the direction of rotation of the brake disk.

The present invention applies in particular to a braking system for a private vehicle.

The invention claimed is:

1. Friction element (P) for a disk brake that includes a support plate (2) and a friction material (3) fixed on one of the faces of said support plate (2), said support plate (2) being substantially in the form of an arc of a circle, and that also includes a projection (38) extending radially toward the outside of the arc of the circle, a spring element (22) being fixed to said radial projection (38), said spring element (22) being produced from wire wound as turns and provided with a first and with a second arm (30, 32) that extend in two opposite directions substantially tangentially to said turns, characterized in that said support plate (2) includes an orifice (40) for the fitting of the spring element, in which the wound section is mounted, the first and second arms (30, 32) extending on either side of the support plate (2), and in that the first and second arms (30, 32) are of different lengths, the first arm (30) exerts a first force oriented in a first direction and the second arm (32) exerts a second force oriented in a second direction, such that the first force is oriented at an acute angle toward the front or toward the rear of the friction element with respect to the second force.

2. Friction element for a disk brake according to claim 1, characterized in that the second arm (32) is oriented forward of the first arm (30) in the direction of rotation (F) of the brake disk.

3. Friction element for a disk brake according to claim 1, characterized in that the respective ends of the first and second arms (30, 32) are curved substantially toward an axis of the turns.

4. Friction element according to claim 1, characterized in that it includes, respectively at a first (10) and a second (12) end of the arc of the circle, a first and a second finger (14, 16) capable of interacting, respectively, with a first and a second slideway (18, 20) made in a carrier (44) of the disk brake.

5. Friction element according to claim 1, characterized in that it forms the inside friction element of the disk brake.

6. Friction element for a disk brake according to claim 2, characterized in that the respective ends of the first and second arms (30, 32) are curved substantially toward an axis of the turns.

7. Friction element according to claim 6, characterized in that it includes, respectively at a first (10) and a second (12) end of the arc of the circle, a first and a second finger (14, 16) capable of interacting, respectively, with a first and a second slideway (18, 20) made in a carrier (44) of the disk brake.

8. Friction element according to claim 7, characterized in that it forms the inside friction element of the disk brake.

9. Disk brake that includes a caliper, an inside friction element and an outside friction element, at least one piston capable of applying the inside friction element against a first face of a disk brake, characterized in that it includes at least one friction element that includes a support plate (2) and a friction material (3) fixed on one of the faces of said support plate (2), said support plate (2) being substantially in the form of an arc of a circle, and that also includes a projection (38) extending radially toward the outside of the arc of the circle, a spring element (22) being fixed to said radial projection (38), said spring element (22) being produced from wire wound as turns and provided with a first and with a second arm (30, 32) that extend in two opposite directions substantially tangentially to said turns, characterized in that said support plate (2) includes an orifice (40) for the fitting of the spring element, in which the wound section is mounted, the first and second arms (30, 32) extending on either side of the support plate (2), and in that the first and second arms (30, 32) are of different lengths, the first arm (30) exerts a first force oriented in a first direction and the second arm (32) exerts a second force oriented in a second direction, such that the first force is oriented at an acute angle toward the front or toward the rear of the friction element with respect to the second force, the arms (30, 32) of said spring element being mounted so as to bear under mechanical stress against an inside face of an arch (50) of the caliper (42).

10. Disk brake according to claim 9, characterized in that it includes a carrier (44) designed to be secured to a stub axle of a motor vehicle, in that the caliper (42) is mounted so as to slide relative to the carrier (44), in that the caliper (42) includes a nose capable of applying the outside pad against a second face of the brake disk, in that it includes first and second slides (18, 20) of a shape that complements the first and second fingers (14, 16) of the friction element, the first finger (14) being mounted with clearance in the first slide (18) in the direction of rotation (F) of the brake disk such that the inside pad/carrier (44) assembly forms a rigid framework when the friction material of the inside pad comes into contact with the brake disk.

11. Disk brake according to claim 9, characterized in that the outside pad is integral with the caliper nose.

12. Disk brake according to claim 11, characterized in that the outside pad is held transversely relative to the caliper by interaction of pegs (62) and of cavities (64) for receiving said pegs (62) carried by the friction element and the caliper nose.

13. Disk brake according to claim 9, characterized in that the carrier (44) includes a first (47) and a second (49) pin that extend parallel to the axis of the brake disk and are designed to slide, respectively, in first and second bores made in the caliper.

14. Disk brake according to claim 10, characterized in that the outside pad is integral with the caliper nose.

15. Disk brake according to claim 14, characterized in that the outside pad is held transversely relative to the caliper by interaction of pegs (62) and of cavities (64) for receiving said pegs (62) carried by the friction element and the caliper nose.

16. Disk brake according to claim 15, characterized in that the carrier (44) includes a first (47) and a second (49) pin that extend parallel to the axis of the brake disk and are designed to slide, respectively, in first and second bores made in the caliper.

* * * * *